United States Patent
Banik et al.

[11] Patent Number: 6,111,898
[45] Date of Patent: Aug. 29, 2000

[54] METHOD OF ESTABLISHING WHEN TO PROPAGATE THE OUTPUT OF A MULTIPLEXER

[75] Inventors: Jash Banik, Aloha; Mark Nardin, Hillsboro; Shawn Searles; Dane Abrigana, both of Beaverton, all of Oreg.

[73] Assignee: Intel Corporation, Santa Clara, Calif.

[21] Appl. No.: 08/987,184

[22] Filed: Dec. 8, 1997

[51] Int. Cl.[7] ............................................. H04J 3/02
[52] U.S. Cl. ................................. 370/537; 327/408
[58] Field of Search ...................... 327/407, 408, 327/409, 410; 326/39; 713/500; 370/537

[56] References Cited

U.S. PATENT DOCUMENTS

| | | | |
|---|---|---|---|
| 5,045,714 | 9/1991 | Park et al. | 307/243 |
| 5,138,188 | 8/1992 | Bazes | 307/265 |
| 5,155,451 | 10/1992 | Gladden et al. | 331/1 |
| 5,347,472 | 9/1994 | Podkowa | 364/569 |
| 5,436,574 | 7/1995 | Veenstra | 326/39 |
| 5,623,638 | 4/1997 | Andrade | 395/494 |

OTHER PUBLICATIONS

David A. Bell, Solid State Pulse Circuits, A reston Book Prentice Hall, ISBN 0–8359–7052–3, 1988.

M. Morris Mano, Digital Logic and Computer Design, 1979 Prentice–Hall International, ISBN 0–13–214510–3, 1979.

*Primary Examiner*—Chau Nguyen
*Assistant Examiner*—Chiho Andrew Lee
*Attorney, Agent, or Firm*—Blakely, Sokoloff, Taylor & Zafman LLP

[57] ABSTRACT

A method for establishing when to propagate the output of a multiplexer using a timing analyzer. The method uses not only the enabling edges, but also the disabling edges, of control signals to the multiplexer.

3 Claims, 1 Drawing Sheet

METHOD OF ESTABLISHING WHEN TO PROPAGATE THE OUTPUT OF A MULTIPLEXER

BACKGROUND OF THE INVENTION

1. Field of the Invention

This invention relates generally to integrated circuits more particularly, to a method of accurately determining propagation delays through multiplexers used in such circuits.

2. DESCRIPTION OF THE RELATED ART

In high speed integrated circuit design, e.g., the design of microprocessors, performance verification of the circuit design is accomplished by using timing analyzers which simulate the operation of the product being designed. Such analyzers function, for example, to calculate the amount of time that it takes for a particular signal to be propagated from a first circuit location to a second circuit location. In performing that function, the analyzers calculate the propagation delays through the individual circuit devices in the path between the first and second circuit locations.

One type of circuit device that is very commonly used in high speed integrated circuit design is a digital multiplexer composed of either passgates or tristate gates. A multiplexer has a plurality of sets of data input signals and a plurality of control signal inputs. The logic states of the control signal inputs determine which set of data input signals appear at the output of the device at any particular time. For example, the 2×1 multiplexer shown in FIG. 1 has two sets of data input signals, I1 and I2, and two control signal inputs, C1 and C2. The value of the output of the multiplexer is the value of input I1 when the control signals C1 and C2 have logic states of "1" and "0," respectively. In order for the value of the output of the multiplexer to assume the value of data input I2, the control signal C1 is switched from a logic "1" to a logic "0" and the control signal C2 is switched from a logic "0" to a logic "1," as shown in FIG. 2.

In actual circuits, disabling control edge 200 of control input signal C1 can occur much later in time than the enabling control edge 201 of control input signal C2, as shown in FIG. 2. In other words, both passgates 101 and 102 in FIG. 1 are enabled for the period of time, $t_c$, between the enabling edge 201 of control input signal C2 and the disabling edge 200 of control signal C1, which results in a large contention current flowing through passgates 100 and 101 during the time $t_c$. Until control signal C1 actually turns off, control signal C2 cannot drive a proper value to the output of the multiplexer. Thus, the time at which the value of the output of the multiplexer is the value of input I2 has been "pushed out" from the leading edge of control signal C2.

Heretofore, static timing analyzers have only used the enabling edge of control signals to determine when to propagate the output of a multiplexer and have ignored the potential interaction described above between the disabling edge of a control signal and the enabling edge of a control signal. Accordingly, critical timing paths and functional race conditions may have been missed.

SUMMARY OF THE INVENTION

In accordance with the present invention, a method is provided for accurately calculating propagation delay through a multiplexer using a static timing analyzer. This method measures delays through a multiplexer from both an enabling and a disabling edge of each control signal rather than just the enabling edge. This method also proposes an alternate method where the delay coming off an enabling edge of a control signal is delayed until the disabling edge of a control signal, if the disabling edge comes after the enabling edge.

BRIEF DESCRIPTION OF THE DRAWINGS

Other objects and advantages of the invention will become apparent upon reading the following detailed description and upon reference to the drawings in which.

Figure 1:
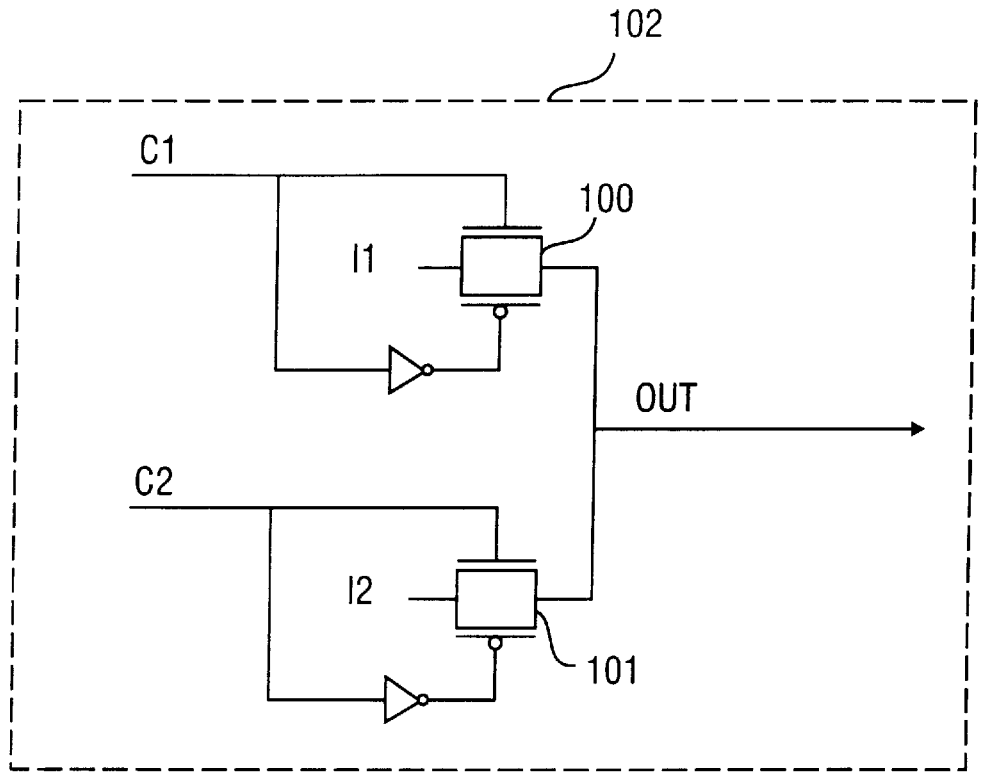
FIG. 1 is a schematic diagram in block diagram form illustrating a multiplexer.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
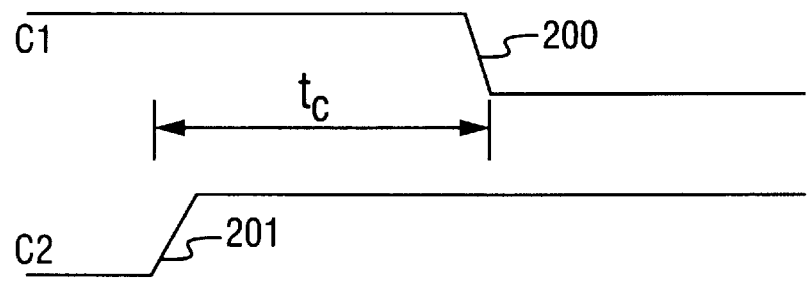
FIG. 2 is a timing diagram illustrating control signals that are applied to the multiplexer of FIG. 2.

With reference to FIGS. 1 and 2, a multiplexer 102 in an integrated circuit is composed of passgates or tristate gates 100 and 101. While multiplexer 102 is depicted as a 2×1 multiplexer for ease of illustration, those skilled in the art will appreciate that the method of the present invention is applicable to any size multiplexer.

In accordance with the present invention, in multiplexer 102 delays will be propagated from both the disabling edge 200 of control signal C1 and the enabling edge 201 of C2. In a static timing tool, timing analysis is done by calculating delays through one circuit path at a time. Because of this limitation, the tool cannot do a simultaneous interaction analysis between C1-Out and C2-Out paths and hence does not understand the contention between control signal C1 and C2. Since a disabling control signal (like edge 200 of C1) does not generate a new logic value at the output, this edge has been ignored before, for timing analysis. Though the disabling edge does not generate a new logic value, it does, however, affect when an actual logic value can be driven to the output through an enabled path. This time domain dependency between edge 200 of C1 and 201 of C2 can be captured by propagating a delay from edge 200 of C1, since this edge indicates the end of contention. But since a disabling edge does not generate a new logic value at the output, a pseudo delay value is propagated from disabling edge 200 of C1. This mechanism of propagating a pseudo delay from a disabling edge can capture the contention situation in the multiplexer and can hence do a proper timing delay analysis through it. Another proposed way to capture this contention using static timing analysis method is to postpone the propagation delay coming off edge 201 of C2 until edge 200 of C1.

In accordance with the present invention, a timing analyzer is provided having circuitry to implement the propagation of the output of a multiplexer as described herein.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of performing a timing analysis of an integrated circuit which includes a multiplexer comprising:

initializing the multiplexer to a first state, in which a first control signal enables a first input to be coupled as output from the multiplexer and a second control signal disables a second input from being coupled to the output;

changing the multiplexer to a second state to couple the second input to the output and disable the first input from being coupled to the output, but in which an enabling edge of the second control signal changes prior to a disabling edge of the first control signal causing a transition period between the first and second states in which both inputs contend for the output; and propagating the occurrence of the disabling edge of the first control signal in addition to noting the enabling edge of the second control signal to identify duration of the transition period.

2. A method of performing a timing analysis of an integrated circuit which includes a multiplexer comprising:

initializing the multiplexer to a first state, in which a first control signal enables a first input to be coupled as output from the multiplexer and a second control signal disables a second input from being coupled to the output;

changing the multiplexer to a second state to couple the second input to the output and disable the first input from being coupled to the output, but in which an enabling edge of the second control signal changes prior to a disabling edge of the first control signal causing a transition period between the first and second states in which both inputs contend for the output; and postponing an indication of the enabling edge of the second control signal until the occurrence of the disabling edge of the first control signal to identify end of the transition period.

3. A multiplexer comprising:

a first gating circuit coupled to receive a first input and a first control signal, in which the first control signal enables the first input to be coupled as output from the multiplexer;

a second gating circuit coupled to receive a second input and a second control signal, in which the second control signal enables the second input to be coupled as output from the multiplexer, but in which a steady state allows only one of the two inputs to be coupled to the output, said gating circuits having the two control signals transitioning at different times, in which an enabling edge of one control signal changes prior to a disabling edge of the other control signal to induce a transition period in which both inputs contend for the output; and said gating circuits propagating an occurrence of the disabling edge of the one control signal in respect to noting the enabling edge of the other control signal to identify duration of a transition period between initiation of a state change and until another steady state is reached.

* * * * *